Oct. 17, 1933.  H. B. DONLEY  1,930,791
STOKER TRANSMISSION
Filed Oct. 18, 1932   2 Sheets-Sheet 1

Inventor
H. B. Donley
W. S. McDowell
Attorney

Oct. 17, 1933.   H. B. DONLEY   1,930,791
STOKER TRANSMISSION
Filed Oct. 18, 1932   2 Sheets-Sheet 2

Inventor
H. B. Donley

Attorney

Patented Oct. 17, 1933

1,930,791

UNITED STATES PATENT OFFICE 1,930,791

STOKER TRANSMISSION

Harold B. Donley, Columbus, Ohio, assignor to Columbus Metal Products, Inc.

Application October 18, 1932. Serial No. 638,427

3 Claims. (Cl. 74—58)

This invention relates broadly to improvements in automatic stoker apparatus for feeding solid combustible fuels to furnace chambers and, with reference to its more specific aspects, it is an object of the invention to provide an improved and simplified gear transmission for use in apparatus of this character by means of which the speeds and power of the electric driving motor may be imparted to the fuel conveyor under convenient control whereby to regulate the quantity of fuel delivered by the stoker apparatus to an associated combustion chamber.

It is another object of the invention to provide a transmission for automatic stokers of the so-called turret type wherein compound gears may, through manual adjustment, be brought into selective engagement with driving and driven gears, the said compound gears providing for variations in speed ratio between the driving and driven parts whereby to obtain a desired speed on the part of the driven member without any variation in the speed of the shaft of the driving motor.

For a further understanding of the invention, reference may be made to the following description and the accompanying drawings, wherein:—

Figure 1:
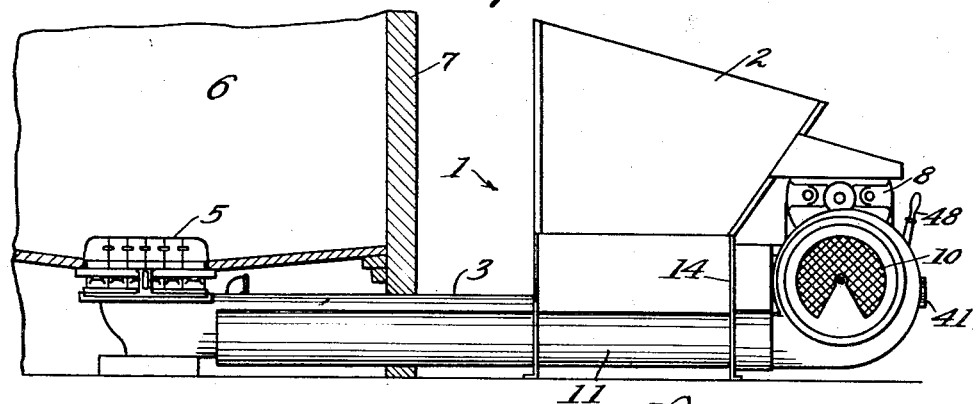
Fig. 1 is a side elevation of automatic stoker apparatus embodying the transmission comprising the present invention.
Figure 2:
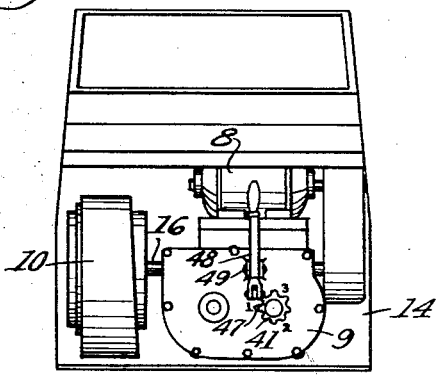
Fig. 2 is a front view of the stoker apparatus.

Referring more particularly to the drawings, the numeral 1 designates an automatic stoker of the under-feed type which has been selected for illustration, although it will be understood at this point that my improved transmission may be used in connection with other types of stoker apparatus from that herein depicted. The stoker apparatus embodies the usual hopper 2, a fuel conduit 3 in which is mounted a feeding worm or auger 4, the latter upon rotation serves to advance the fuel from the hopper through the conduit 3 and to deliver the same to tuyère blocks 5 arranged in the bottom of the combustion chamber 6 of a suitable furnace 7. The worm or auger 4 is driven by an electric motor 8 through the gear transmission 9 comprising the present invention, and the motor 8 also operates a fan or blower 10 by means of which air under some pressure is delivered to the combustion chamber and the tuyères 5 by way of an air conduit 11.

The transmission 9 comprises a casing consisting of a body section 12 and a separable cover section 13, the said casing being suitably mounted in connection with the frame 14 of the stoker. The upper portion of the body section 12 is provided with a pair of transversely spaced bearings 15, in which are rotatably mounted the end portions of a shaft 16 carrying a worm 17. One end of the shaft 16 projects beyond the gear case and is provided with a pulley 18 around which passes a belt 19, which leads to a corresponding pulley, not shown, carried by the armature shaft of the motor 8.

The worm 17 meshes with a worm gear 20 which is loosely mounted for rotation on an auger driving shaft 21 journaled for rotation in longitudinally spaced bearings 22 provided in connection with the body and cover sections of the gear case. The hub of the gear 20 is extended and is formed with a pinion 23, and this pinion is adapted to mesh through selective control with a plurality of compound gears of differing diameter provided in connection with a revoluble turret.

The turret comprises a pair of spaced heads 24 and 25. The head 24 is formed with an extended sleeve 26 which is rotatably received within a bearing 27 formed with the cover section 13. The heads 24 and 25 are secured together for unitary rotation about the axis of a counter-shaft 28 by the provision of studs 29 extending transversely between said heads. The studs 29 are at one end reduced in diameter and provided with threaded extensions 30, which are received within correspondingly threaded sockets extending from the inner face of the head 24. The opposite ends of the studs 29 are formed with internally threaded sockets adapted for the reception of the threaded ends of headed bolts 31, which pass transversely through openings formed in the head 25.

Rotatable about alternate studs 29 between the heads 24 and 25 are compound gears 32, 33 and 34. By the rotation of the turret comprising the heads 24 and 25 and said compound gears, the latter may be selectively engaged with the teeth of the pinion 23 to vary the R. P. M. of the counter-shaft 28. Each of the gears 32, 33 and 34 is of different diameter than the remaining compound gears and is provided with a different number of teeth. The said gears, however, due to the eccentricity of their axes with respect to the turning axis of the turret may be brought into proper meshing relationship with the teeth of the pinion 23. The gear 32 has integrally or otherwise formed therewith for unitary rotation an associated smaller gear 35 and likewise the gear 33 has similarly formed or associated therewith a somewhat smaller gear 36, the latter however being of greater diameter and possessing a larger number of teeth than the gear 35, while the gear 34 possesses a companion portion of the same diameter and the same number of teeth as indicated at 37. The gears 35, 36 and 37 mesh with a somewhat larger gear 38 provided with a longitudinally extending sleeve 39 which surrounds the counter-shaft 28 and turns in the bearing offered by the sleeve 26. A shear pin 40 connects the sleeve 39 with the counter-shaft 28 so that the latter will be rotated when power is imparted to the gear 38. Also, in the event the driven member of the stoker apparatus should become clogged or jammed, the drive will be relieved by the breaking of the frangible pin 40. The sleeve 26 is formed at its outer end with a reduced threaded portion which receives a removable hand knob 41. This knob is used to rotate the turret head to different positions of driving adjustment, and, in the event of injury to the drive, it may be removed in order to provide convenient access to the pin 40.

The inner end of the counter-shaft 28 is suitably journaled in a bearing 42, formed in connection with the body section 12 and adjacent to the bearing 42, the counter-shaft is provided with a keyed pinion 43 which meshes with an enlarged gear 44 fixed to the shaft 21. The inner end of the shaft 21 is provided with a squared extension 46 which is receivable within a socket formed in one of the journaled ends of the worm or auger 4.

In operation, when it is desired to operate a coal feeding auger at its lowest rate of speed to deliver coal, or other similar fuel, to the combustion chamber 6, the turret head is rotated axially about the shaft 28 in order that the gear 32 will be brought into meshing engagement with the teeth of a pinion 23. Power is delivered to the shaft 16 from the electric motor 8 and through the worm and worm gear 17 and 20 repectively rotary movement is imparted to the gear 23 and thence to the gear 32. The smaller gear 35 associated with the gear 32 drives the gear 38 and the latter through the medium of the frangible pin 40 rotates the counter-shaft 28, the pinion 43, the enlarged gear 44 and the feeding auger 4. If it is desired to increase somewhat the revolutions per minute of the conveyor or auger 4, the turret head may be rotated to bring the gear 33, which is of smaller diameter than the gear 32, into meshing engagement with the pinion 23. Due to the reduced diameter or smaller number of teeth of the gear 33 as regards the gear 32, and also due to the fact that the gear 36 associated with the gear 33 is of larger diameter and possesses a greater number of teeth than the gear 35, it follows that the conveyor shaft 4 will be rotated at a somewhat higher rate of speed than when the gears 32 and 35 are driving directly from the pinion 23. To further step up the speed, the gears 34 and 37 may be registered with the pinion 23. These gears are of smaller diameter than either of the gears 32 and 33 and larger in diameter than the gears 35 and 36 and provide for the highest rotation of speed of the shaft 4. The spacing of the gears also provides for neutral or non-driving positions. The sleeve 26 of the head 24 may be provided with a pointer 47 movable over a suitable graduated surface so that the operator may observe, exteriorly of the gear case, the driving positions of the compound turret gears.

Figure 6:
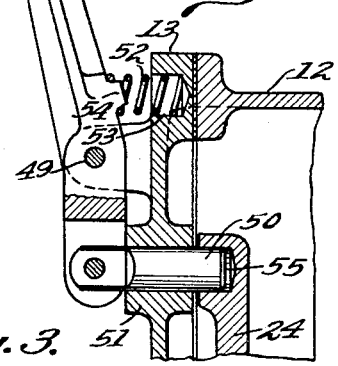
Fig. 6 is a detail sectional view of the locking lever for retaining the turret of the transmission in selected positions of adjustment.
Figure 3:
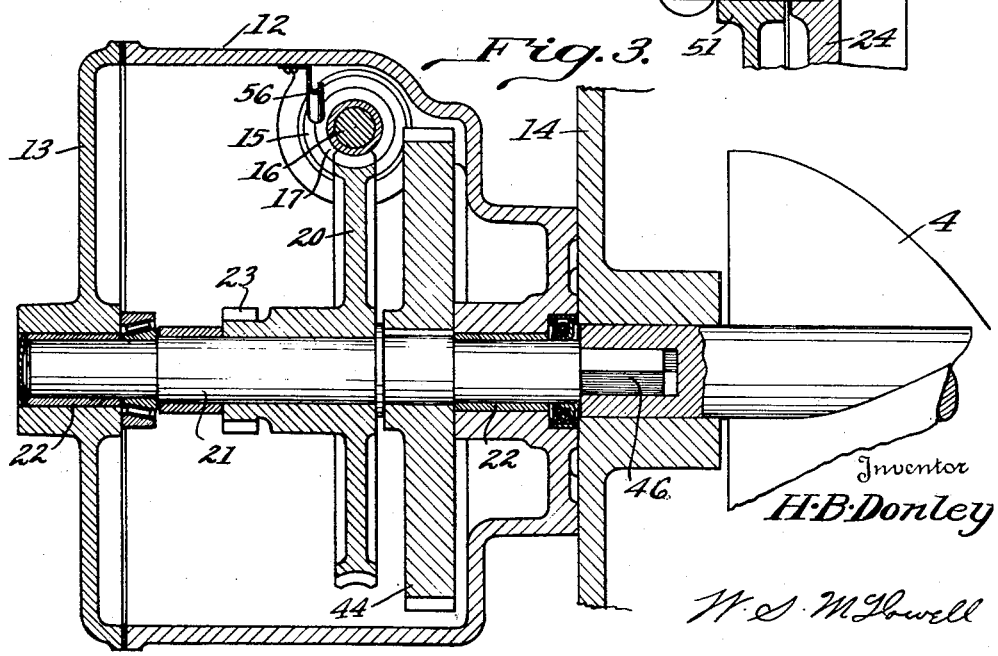
Fig. 3 is a vertical transverse sectional view taken through the improved transmission.
Figure 4:
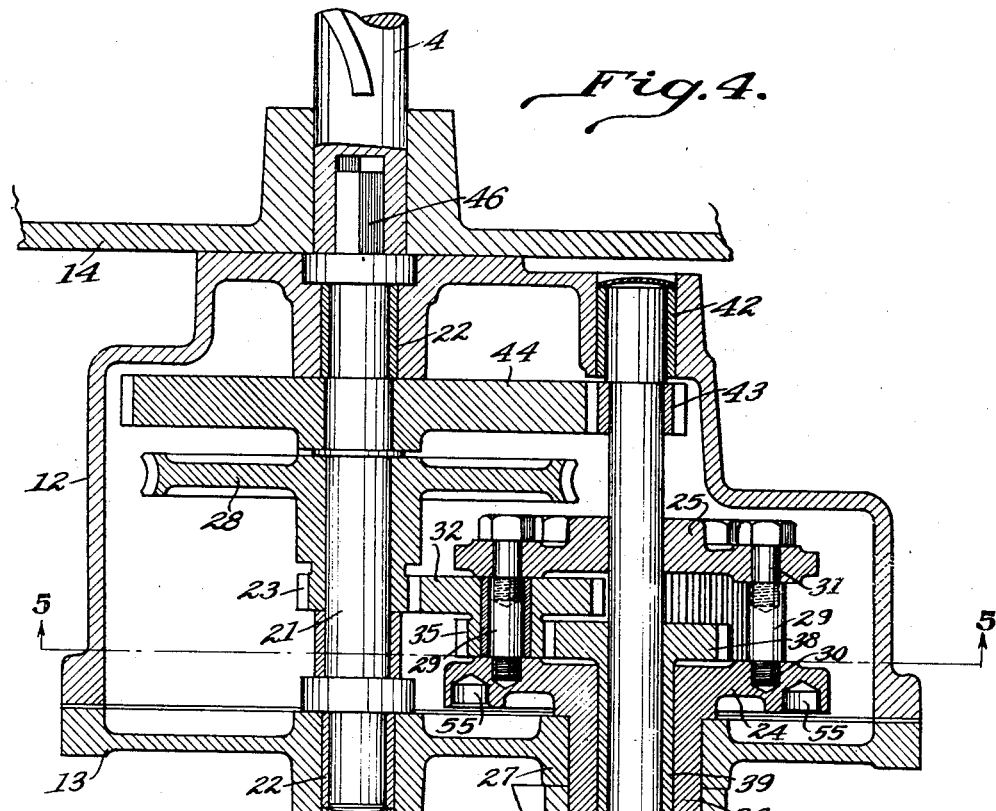
Fig. 4 is a horizontal sectional view thereof.
Figure 5:
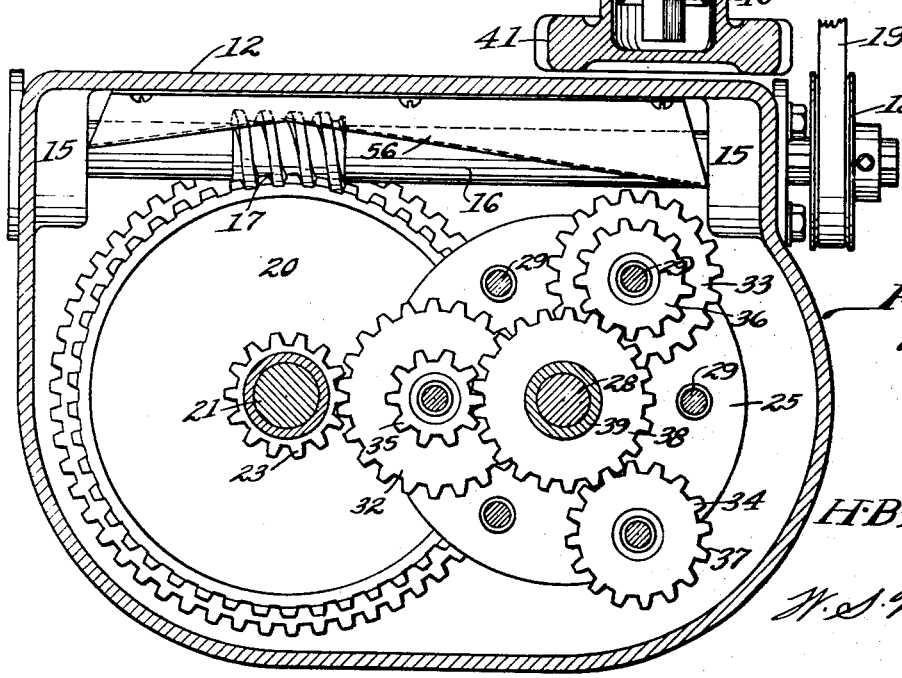
Fig. 5 is a vertical transverse sectional view taken through the transmission on the plane indicated by the line 5—5 of Fig. 4.

As shown in Fig. 6, turret gears may be located in any of their driving or neutral positions by the provision of a hand lever 48, which is pivoted as at 49 on the cover section 13. The lower end of the lever is pivotally connected with a sliding latch bolt 50 movable in a bearing 51 provided in connection with the cover section 13, and the lever 48 is normally pressed by means of a coil spring 52, disposed at one end in a socket 53 formed in connection with the cover section and engaged at its other end with a boss 54 projecting from the lever 48. The inner end of the latch bolt 50 is adapted to be received within any one of a plurality of sockets 55 formed contiguous to the peripheral portion of the head 24, whereby to retain the head against rotation when the lever 48 is released. In view of the foregoing, it will be seen that the present invention provides a positive, simple and efficient selective gear transmission which is particularly useful in the field of automatic stoker apparatus. The transmission serves to step down the relatively high speeds of rotation per minute of electrical motors used in the operation of apparatus of this character, so that such a motor may be employed for the dual purpose of operating the fan or blower or such a system and at the same time drive the feeding devices which are employed to transmit coal from a magazine or storage hopper to the combustion chamber of the furnace. When an auger is employed, as indicated at 4, it follows that the speed of its rotation must be exceedingly slow as compared with the high speed of the electric motor shaft, and this the present invention accomplishes with but the use of a single worm and worm gear.

Usually, it has been the custom to employ in transmissions of this kind pawl and ratchet mechanism for securing the necessary speed reduction. In the present invention, such more or less sensitive and delicate parts are eliminated and the transmission rendered sturdy, substantial and efficient and therefore not likely to become out of order or to occasion repair. The transmission as a whole may be kept further lubricated by the oil-tight construction of the gear case, thus reducing wear through friction. In this connection, a trough 56 may be disposed adjacent to the worm 17, so that as the worm rotates, the splash of oil therefrom may be collected in the trough 56 and conducted to the bearings 15 for the shaft 16. By the mere adjustment of the knob 41, any of the three driving speeds afforded by the transmission may be obtained.

What is claimed is:

1. In a variable speed stoker transmission, a casing and a cover therefor, horizontally spaced driving and counter-shafts journaled for rotation in bearings provided in said casing and cover, a transversely disposed power shaft rotatably mounted in said casing above the driving and counter-shafts, a worm unitarily rotatable with said power shaft, a worm gear loosely mounted for rotation on the driving shaft, a pinion fixed for rotation in unison with the worm gear and rotatable about the axis of the driving shaft independently thereof, a head rotatably supported in a bearing provided in said cover plate about the axis of said counter-shaft, studs carried by said head and disposed in eccentric relationship to the axis of the counter-shaft, three gears of varying diameter rotatably supported by said studs and operable upon the rotation of said head to be selectively engaged with said pinion, secondary pinions rotatable with two of said last-named gears, a center gear fixed to rotate in unison with said counter-shaft, said center gear being constantly in mesh in said secondary pinions and the third of the head carried gears, means for maintaining said head in its positions of adjustment to maintain a desired gear carried thereby in mesh with the worm gear driven pinion, a pinion fixed to the counter-shaft, and an enlarged gear fixed to said driving shaft and arranged to mesh constantly with said last-named pinion.

2. In a variable speed stoker transmission, a gear case, horizontally spaced driving and counter-shafts journaled for rotation in bearings provided in said case, a transversely disposed power shaft journaled in the upper portion of said casing and lying at right angles to the driving and counter-shafts, said latter shafts being disposed in substantially the same horizontal plane, a worm fixed for rotation in unison with said power shaft, a worm gear loosely mounted for rotation on said driving shaft and arranged to mesh constantly with said worm, a pinion formed in connection with the hub of said worm gear, a turret head rotatable in a bearing provided in the front of said case about the axis of said counter-shaft, a plurality of intermediate gears of varying diameter supported for rotation by said head and operable upon the rotation of the latter to be selectively engaged with the worm gear pinion, secondary gears of varying diameter fixed to said intermediate gears, a center gear provided with an extended hub arranged to project beyond the bearing in said gear case in which said head is mounted, an exterior knob removably connected with the outer end of said head for rotating the latter, a frangible connection between the extended hub of said center gear and said counter-shaft, said frangible connection being accessible when said knob is removed from connection with said head, said center gear being in constant mesh with the secondary gears carried by said intermediate gears and with an intermediate gear having no secondary gear formed therewith, the axes of the intermediate gears being eccentric to the axis of the counter-shaft, a pinion fixed on said counter-shaft, and an enlarged gear fixed to the driving shaft and constantly in mesh with said last-named pinion.

3. In a variable speed stoker transmission, a gear case, horizontally spaced driving and counter-shafts journaled for rotation in bearings provided in said case, said shafts being disposed in substantially the same horizontal plane, a driving gear loosely mounted on the driving shaft, a turret comprising spaced heads connected by shouldered threaded studs, said turret being loosely mounted for turning movement about the axis of said counter-shaft, intermediate gears of varying diameter rotatable about the axes of said studs, the axes of said intermediate gears being eccentrically spaced with respect to the axis of the counter-shaft, a center gear constantly in mesh with said intermediate gears, the outer of said turret heads being provided with an extended hub arranged for rotation in a bearing formed in the front of said gear case, a rotatable knob connected with the outer end of the extended hub of said head for revolving said head to effect selective engagement of said intermediate gears with the driving gear, an extended sleeve formed with the center gear surrounding said counter-shaft and terminating beyond the outer end of the extended hub of the turret head, a frangible connection uniting the outer end of said sleeve with said counter-shaft, said connection being normally protected by said knob but accessible when said knob is removed from engagement with said head, means for retaining said head in fixed positions of rotary adjustment, and speed reducing means between said counter and driving shafts.

HAROLD B. DONLEY.